(12) United States Patent
Akao et al.

(10) Patent No.: US 12,031,864 B2
(45) Date of Patent: Jul. 9, 2024

(54) SPECTROMETER

(71) Applicant: JASCO CORPORATION, Tokyo (JP)

(72) Inventors: Kenichi Akao, Tokyo (JP); Yuji Higuchi, Tokyo (JP); Tsubasa Asatsuma, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 109 days.

(21) Appl. No.: 17/980,641

(22) Filed: Nov. 4, 2022

(65) Prior Publication Data

US 2023/0146740 A1  May 11, 2023

(30) Foreign Application Priority Data

Nov. 5, 2021 (JP) ................. 2021-181242

(51) Int. Cl.
*G01J 3/02* (2006.01)
*G01J 3/453* (2006.01)

(52) U.S. Cl.
CPC .............. *G01J 3/0264* (2013.01); *G01J 3/021* (2013.01); *G01J 3/027* (2013.01); *G01J 3/4535* (2013.01)

(58) Field of Classification Search
CPC .......... G01J 3/0264; G01J 3/021; G01J 3/027; G01J 3/4535; G01J 3/28; G01J 3/45; G01J 3/10; G01J 3/108; G01B 9/02
See application file for complete search history.

(56) References Cited

U.S. PATENT DOCUMENTS

| | | | |
|---|---|---|---|
| 7,034,944 B2* | 4/2006 | Rapp ...................... | G01J 3/453 356/451 |
| 2016/0066775 A1* | 3/2016 | Hunter .................. | G01J 3/1256 600/178 |
| 2017/0167987 A1* | 6/2017 | Turovets ............ | G01N 21/9501 |

FOREIGN PATENT DOCUMENTS

JP        2016-161408        9/2016

* cited by examiner

*Primary Examiner* — Abdullahi Nur
(74) *Attorney, Agent, or Firm* — Greenblum & Bernstein, P.L.C.

(57) ABSTRACT

A spectrometer capable of providing information, to a measurer, necessary for determining whether a sample set to the spectrometer is a sample expected by the measurer or not before a main measurement includes a data processor and a display. The data processor calculates a preliminary spectral information of the sample based on at least n of a latest detected signal and a BKG information retained in advance, calculates and updates the preliminary spectral information based on at least n of the latest detected signal and the BKG information again, and repeats these calculations and updates. The display shows the preliminary spectral information that is calculated and updated in the preview display. The data processor starts integration of N (N>n) of the detected signal during a preview display of the preliminary spectral information, and acquires a spectral information of the sample.

5 Claims, 10 Drawing Sheets

FIG. 3A "No peak"
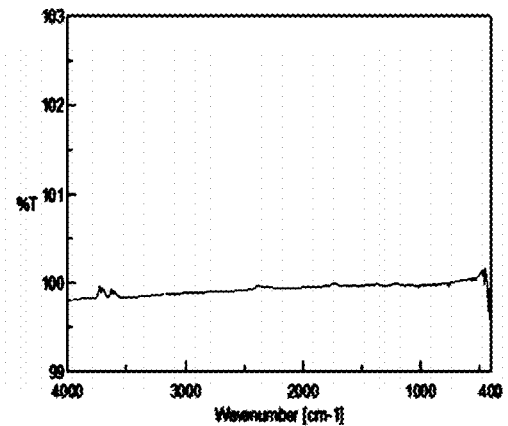
| Within expectation | No contamination |
| Out of expectation | "Bad contact of ATR, low concentration, etc." |
FIG. 3B "Polystyrene"
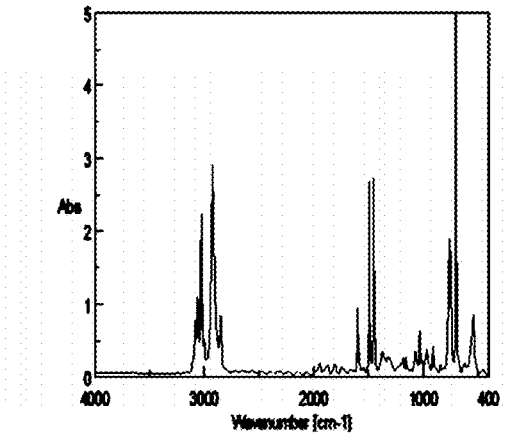
| Within expectation | During measurement of polystyrene |
| Out of expectation | "Calibration sample is still in optical path, etc." |

FIG. 3C "Ethanol"
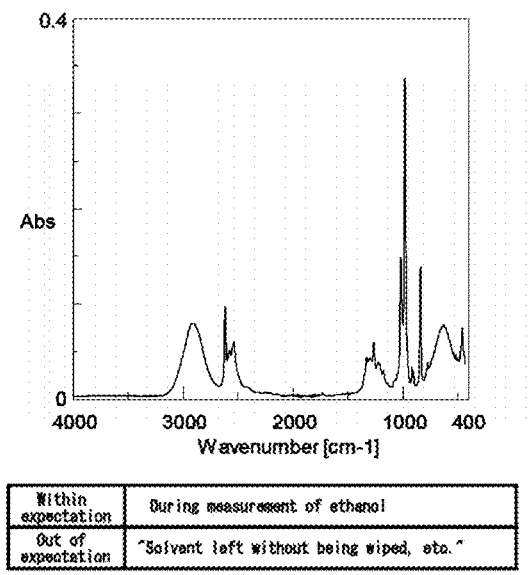
| Within expectation | During measurement of ethanol |
| Out of expectation | "Solvent left without being wiped, etc." |
FIG. 3D "Water"
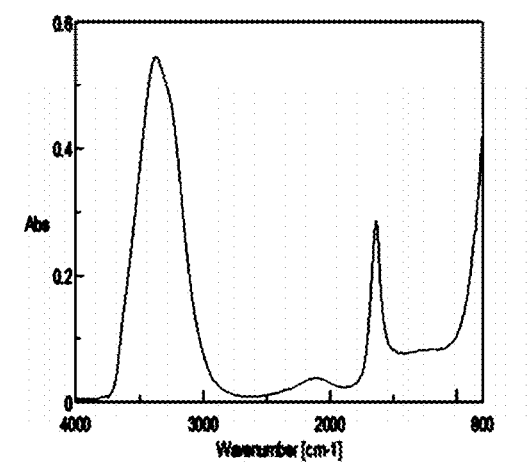
| Within expectation | During measurement of water |
| Out of expectation | "Possibility of damage of window plate (such as KBr)" |

FIG. 4A  "Peak inversion"
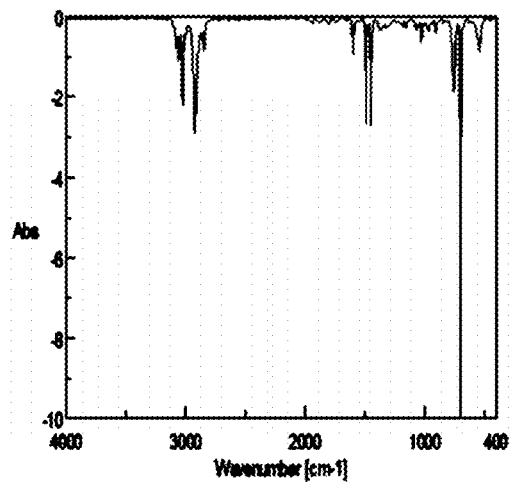
FIG. 4B  "CO₂"
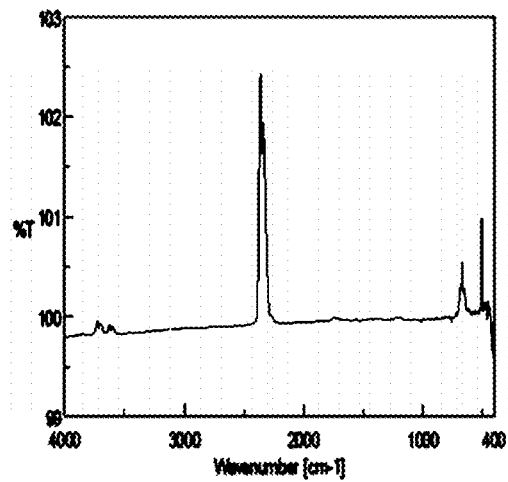

FIG. 4C  "Organic matter"
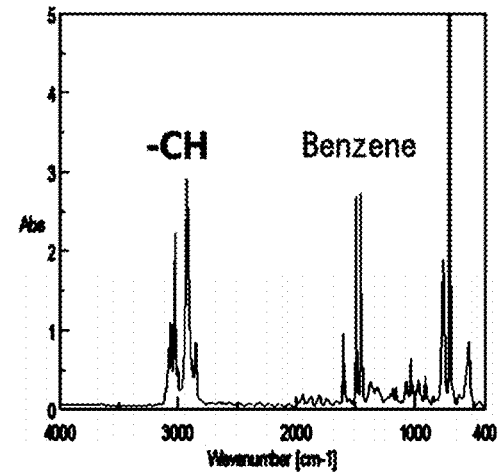
| Within expectation | During measurement of organic matter |
| Out of expectation | "Contamination" |
FIG. 4D  "Metal oxide"
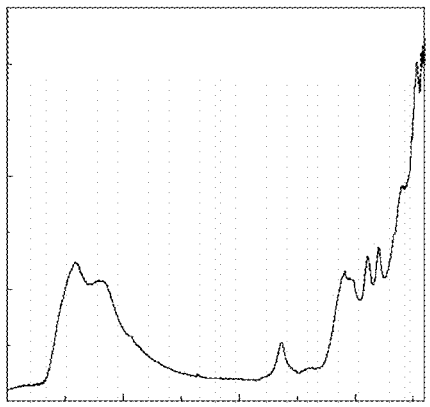
| Within expectation | Measuring metal powder (hard sample) with ATR diamond prism |
| Out of expectation | "Possibility of damage of prism with materials such as ZnSe" | ial information retained in the data processor, and displays an execution result of the spectral analysis on the display.

SPECTROMETER

RELATED APPLICATION

This application claims the priority of Japanese Patent Application No. 2021-181242 filed on Nov. 5, 2021, the disclosure of which is incorporated herein by reference in its entirety.

TECHNICAL FIELD

The present invention relates to a preview function of a spectrometer.

BACKGROUND ART

In general, spectrometers such as Fourier transform infrared spectrometers (FTIR), Raman spectrometers, ultraviolet-visible near infrared spectrophotometers, and spectrofluorometers irradiate a light to a sample, detects the light that has interacted with the sample (reflected light, transmitted light, Raman scattering light, fluorescence, etc.), and calculate a spectral information of the sample based on a light detected value thereof.

The condition for measuring a spectrum needs to be set suitably in accordance with the type or shape of the sample. For example, an infrared microscope capable of measuring a spectrum by an Attenuated Total Reflection method (ATR method) is described in Patent Literature 1. In general, upon measurement of a sample spectrum by the ATR method, a crystal element (also called "prism") having a refractive index that is greater than that of the sample is contacted against the sample, an infrared light is irradiated via the prism to the sample, the infrared light that totally reflects a boundary surface between the prism and the sample is detected to measure the sample spectrum. The prism is formed of various materials (germanium, diamond, zinc selenide, etc.), and is selected in accordance with the type of the sample; therefore, the contact pressure between the prism and the sample needs to be set in accordance with the material type (material strength) of the prism used.

In Patent Literature 1, since the measurer may mistakenly input the type of the prism to the infrared microscope or may forget to input the same, the infrared microscope has a function of distinguishing the type of the prism based on the measurement data of the spectrum. That is, in a state which the prism is not in contact with the sample, the reflected light from the prism at the measurement position is received with a detector to acquire a background spectrum. Then, a pseudo transmission spectrum based on this background spectrum is calculated to distinguish the type of the prism based on the same. Accordingly, upon the following measurement of the sample, the sample can be made in contact with the prism with a different pressure in accordance with the type of the prism.

CITATION LIST

Patent Literature

Patent Literature 1: Japanese Unexamined Patent Publication No. 2016-161408 A

SUMMARY OF INVENTION

Technical Problem

However, when a sample (sample B) that is actually set on the stage is different from the sample (sample A) that is expected to be set to the spectrometer, even the infrared microscope of Patent literature 1 cannot determine that the sample B is not the sample A. Therefore, in the case of Patent Literature 1, the prism suitable for the expected sample A is used to the sample B on the stage, and a measurement data may not be acquired properly depending on the type or shape of the sample B.

Moreover, since there is no microscopic observation in a macro FTIR measurement, information that can be acquired before the measurement is limited compared to a microscopic measurement. For example, in measurement of a liquid, when the solvent for a background measurement (blank sample) is mistaken for the solvent for dissolving the sample for the main measurement, the solvent peak may be inverted on the spectrum, and the background may not be deducted properly.

Like these cases, when the measurer executes a long time and irreversible measurement, such as measurement during sample temperature change, without noticing a mistaken situation, loss of measurement time and loss of the sample may also occur.

In a spectrometer that is required to suitably set a condition for measuring a spectrum in accordance with the sample, the object of the present invention is to provide a spectrometer capable of providing, to the measurer before the measurement, information necessary for the measurer to correctly determine whether the sample set on the spectrometer is the sample expected by the measurer regardless of the degree of proficiency of the measurer.

Solution to Problem

That is, the spectrometer according to the present invention irradiates a measurement light to a sample, detects a light that transmits or reflects the sample or a light that is emitted from the sample by a detector, and calculates a spectral information of the sample based on a detected signal containing the spectral information of the sample, the spectrometer comprises:
  a data processor that
    acquires the detected signals repetitively,
    calculates a preliminary spectral information of the sample based on at least n (n: an integer of 1 or greater) of the latest detected signals and a background (BKG) information acquired and retained in advance in a state without the sample or a state which irradiation of the measurement light is stopped, and retains the preliminary spectral information,
    calculates the preliminary spectral information of the sample based on at least n of the latest detected signal and the BKG information again, and updates the retained preliminary spectral information, and
    repeats calculation of the preliminary spectral information and update thereof; and
  a display that displays the preliminary spectral information retained and updated in the data processor on a graph having a wavenumber range or a wavelength range on one axis and a spectral intensity value on the other axis in real time,
  wherein the data processor starts integration of N (N: an integer greater than n) of the detected signals while the preliminary spectral information is graphically displayed in real time, and acquires the spectral information of the sample based on an integrated value thereof.

Moreover, it is preferred that the data processor executes a spectral analysis based on the preliminary spectral information each time the preliminary spectral information is calculated, and retains and updates a spectral analysis result, and the display displays the spectral analysis result retained and updated in the data processor together with the preliminary spectral information in real time.

Moreover, the spectrometer according to the present invention irradiates a measurement light to a sample, detects a light that transmits or reflects the sample or a light that is emitted from the sample by a detector, and calculates a spectral information of the sample based on a detected signal containing the spectral information of the sample, the spectrometer comprises:

a data processor that acquires the detected signal repetitively, calculates a preliminary spectral information of the sample based on at least n (n: an integer of 1 or greater) of the latest detected signals and a background (BKG) information acquired and retained in advance in a state without the sample or a state which irradiation of the measurement light is stopped, executes a spectral analysis based on the preliminary spectral information, and retains a spectral analysis result, calculates the preliminary spectral information of the sample based on at least n of the latest detected signal and the BKG information, executes the spectral analysis again, and updates the retained spectral analysis result, and repeats calculation of the preliminary spectral information, execution of the spectral analysis and update of the spectral analysis result; and a display that displays the spectral analysis result retained and updated in the data processor in real time, wherein the data processor starts integration of N (N: an integer greater than n) of the detected signals while the spectral analysis result is displayed in real time, and acquires the spectral information of the sample based on the integrated value thereof.

Moreover, the spectral analysis in the above-described invention includes preferably a process of a qualitative analysis based on presence/absence of a peak in the preliminary spectral information, a qualitative analysis or a spectral classification of the preliminary spectral information using a spectral database or machine learning, or a functional group analysis using a spectral feature indicating the presence of a functional group.

Advantageous Effects of Invention

<Preview Function of Preliminary Spectrum>

According to the configuration of the spectrometer of the present invention, the preliminary spectral information of the sample based on at least n, which is less than N, of the detected signals is repetitively calculated before integration of N of the detected signals, which is the main measurement, and the preliminary spectral information retained in a memory of the data processor is updated for each calculation. Simultaneously, the latest preliminary spectral information is graphically displayed (previewed) on the display. That is, in the preview function of the preliminary spectrum of the spectrometer of the present invention, the preliminary spectral information is calculated from a relatively small number of detected signals, and the calculated preliminary spectral information is overwritten in the memory each time; therefore, an increase of the load of an operating portion of the data processor or a shortage of the capacity of the memory does not occur. Moreover, the preliminary spectral information is graphically displayed in real time, so that information effective for the measurer to determine whether the sample is as expected by the measurer or not can be provided to the measurer. As a result, it becomes easier for the measurer to notice mistakes of measurement conditions before starting the main measurement, and acquisition of an unexpected spectrum can be avoided in the main measurement.

<Preview Function of Spectral Analysis>

Moreover, according to the configuration of the spectrometer of the present invention, calculation of the preliminary spectral information of the sample based on at least n, which is less than N, of the detected signals and spectral analysis of the preliminary spectral information are repetitively executed before integration of N of the detected signals, which is the main measurement, is started, and the spectral analysis result retained in the memory is updated each time spectral analysis is executed. Simultaneously, the latest spectral analysis result is displayed (previewed) on the display. That is, in the preview function of spectral analysis of the spectrometer of the present invention, the preliminary spectral information is calculated from a relatively small number of detected signals and spectrally analyzed, and the spectral analysis result is overwritten in the memory each time; therefore, an increase of the load of the operating portion or a shortage of the capacity of the memory can be suppressed. Moreover, the spectral analysis result is displayed in real time, so that information effective for the measurer to determine whether the sample is as expected by the measurer or not can be provided to the measurer as information of the spectral analysis result such as a specific name of a substance. As a result, the probability for the measurer to notice mistakes of measurement conditions before starting the main measurement becomes higher, and acquisition of an unexpected spectrum can be avoided in the main measurement with more certainty.

<Simultaneous Preview Function of Sample Spectrum and Spectral Analysis Result>

A function of providing information to the measurer is enhanced by configuring the spectrometer to execute the preview of the preliminary spectrum and the preview of spectral analysis simultaneously.

BRIEF DESCRIPTION OF DRAWINGS

FIG. 3A-3D illustrates a display example of the display of the spectrometer.

FIG. 4A-4D illustrates a display example of the display of the spectrometer.

DESCRIPTION OF EMBODIMENTS

Figure 1:
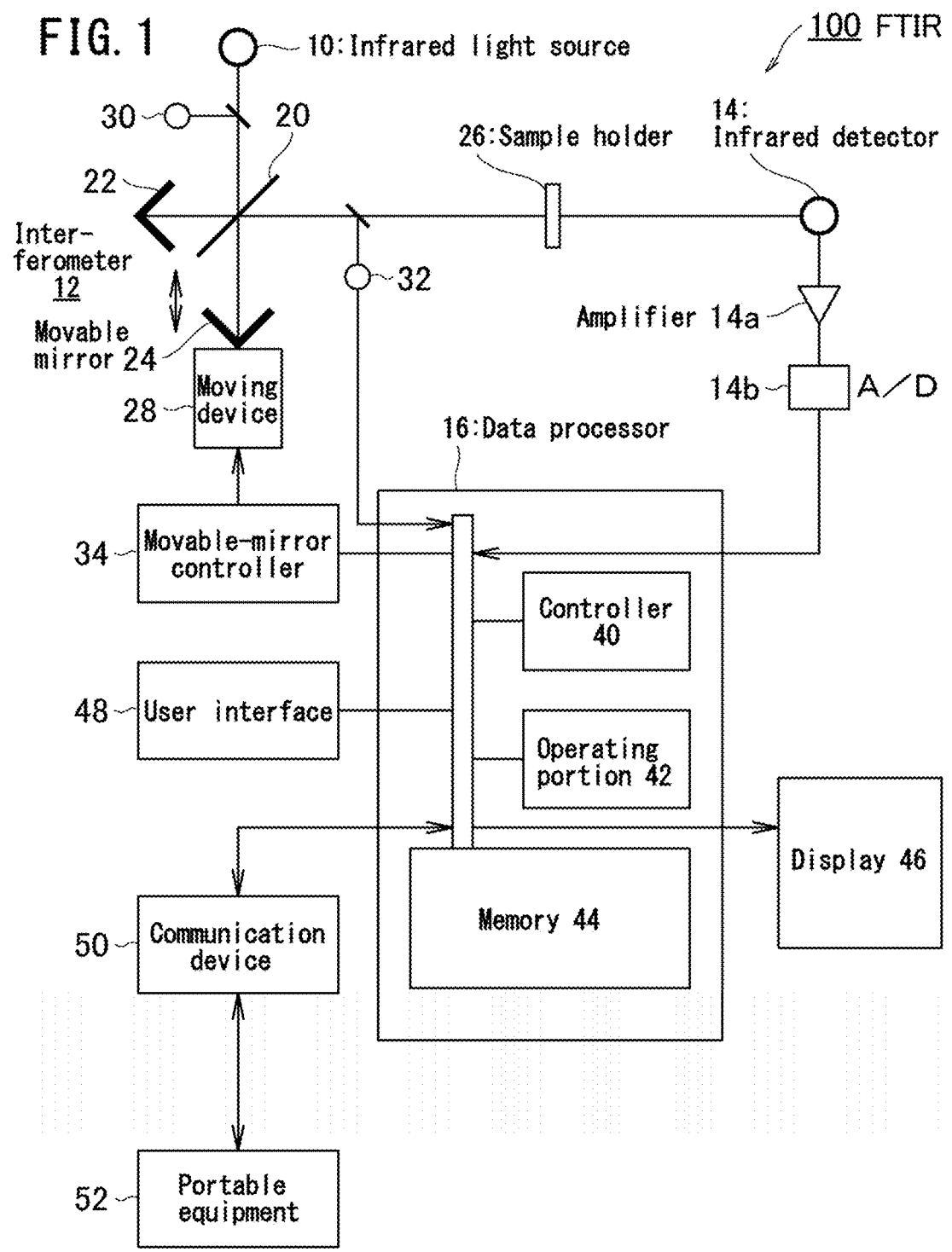
FIG. 1 illustrates a schematic configuration of a Fourier transform infrared spectrometer according to an embodiment of the present invention.

In the following, preferred embodiments of the present invention are described with reference to the drawings. The present invention can be applied to general Fourier transform infrared spectrometers, infrared microscopes and Raman spectrometers. Here, a case where the present invention is applied to a Fourier transform infrared spectrometer (FTIR) 100 as exemplified in FIG. 1 is described in particular. The FTIR 100 comprises: an infrared light source 10; an interferometer 12 that forms an infrared interference wave; a sample holder 26 that holds a sample; an infrared detector 14 that detects intensity of an interference wave acquired by irradiating the infrared interference wave to the sample; and a data processor 16 that calculates a spectral information of the sample based on a detected signal from the infrared detector 14. The data processor 16 is usually configured of a microcomputer installed in the main body of the FTIR 100 or a personal computer that is separate from the main body.

The interferometer 12 has a beam splitter 20 that splits the infrared light, a fixed mirror 22 and a movable mirror 24 that reflect the split light respectively, and synthesizes two beams of different optical path lengths to generate the infrared interference wave. The movable mirror 24 is provided movably in both directions of a direction getting closer to the beam splitter 20 and a direction going away from the same. A moving device 28 of the movable mirror 24 is a voice coil motor, for example. Since the optical path difference between the two beams changes in accordance with the movement of the movable mirror 24, the infrared interference wave modulates. The infrared interference wave irradiates the sample in the sample holder 26 that is provided between the beam splitter 20 and the infrared detector 14. The infrared detector 14 receives the infrared interference wave from the sample, and outputs an intensity signal thereof. The detected signal from the infrared detector 14 is input to the data processor 16 via an amplifier 14a and an A/D convertor 14b.

In order to acquire position information of the movable mirror 24 by a laser light, the interferometer 12 further comprises a semiconductor laser 30 for position reference and a laser detector 32 that detects a laser interference wave. In the present embodiment, the interferometer 12 also functions as a laser interferometer, and a laser light (monochromatic light) from the semiconductor laser 30 is guided to the same optical path as the infrared light. The interferometer 12 also generates a laser interference wave in accordance with the movement of the movable mirror 24, and the laser detector 32 outputs an intensity signal of the laser interference wave to the data processor 16. A dedicated laser interferometer that is separate from the interferometer 12 may be provided to the FTIR 100.

The data processor 16 comprises: a controller 40 that controls each constituent of the data processor 16; an operating portion 42 (also called "calculator") that executes calculation of the spectral information of the sample based on the detected signal from the infrared detector 14, and spectral analysis of the spectral information; and a memory 44 that retains a data processing program executed by the operating portion 42, the calculated spectral information, an analysis result and a background (BKG) information.

Moreover, a display 46 and a user interface 48 are connected to the data processor 16.

Furthermore, a movable-mirror controller 34 is connected to the data processor 16. The operating portion 42 counts a change in intensity of the laser interference wave in accordance with the movement of the movable mirror 24 based on the intensity signal of the laser interference wave from the laser detector 32 to calculate a position information of the movable mirror 24. The movable-mirror controller 34 receives the position information and a target position information of the movable mirror 24, and executes a velocity control, especially a constant velocity control, of the movable mirror 24.

While the movable-mirror controller 34 moves the movable mirror 24 for one stroke, the operating portion 42 receives the intensity signal of the infrared interference wave of one scan, processes data of a plurality of scans, and calculates a transmission spectrum.

A communication device 50 may be connected to the data processor 16, as necessary. The communication device 50 can communicate with a remote portable equipment 52, and displays information that is the same as displayed on the display 46 on a monitor of the portable equipment 52.

<Data Processing Program>

The data processing program is a program for calculating the spectral information of the sample based on the detected signal from the infrared detector 14, and is particularly characterized by a preview function. This data processing program makes the data processor 16 configured of computers to execute the following processing flows S1 to S3.

Here, a case where an ATR measurement unit is provided in a sample chamber of the FTIR 100 instead of the sample holder 26, and a spectrum of the sample is measured with an ATR method is described.

After setting measurement conditions of the infrared light source 10 and the interferometer 12 are completed by an initial operation at power-on, the FTIR 100 automatically starts a preview by the data processor 16. The preview is an operation of repeating a simple measurement of the spectrum of the sample and displaying the spectrum in real time before the main measurement of the spectrum of the sample.

In the present embodiment, after the start the preview, an operation of measuring the BKG information is executed first. Specifically, the spectrum is measured in a state which the sample is not set on a sample table (where the prism is disposed) of the ATR measurement unit. The data processor 16 stores the measured spectrum as the BKG information in the memory (e.g., an address 11 of FIG. 2). This BKG information is used in the preview and the measurement of the spectrum of the sample.

Figure 2:
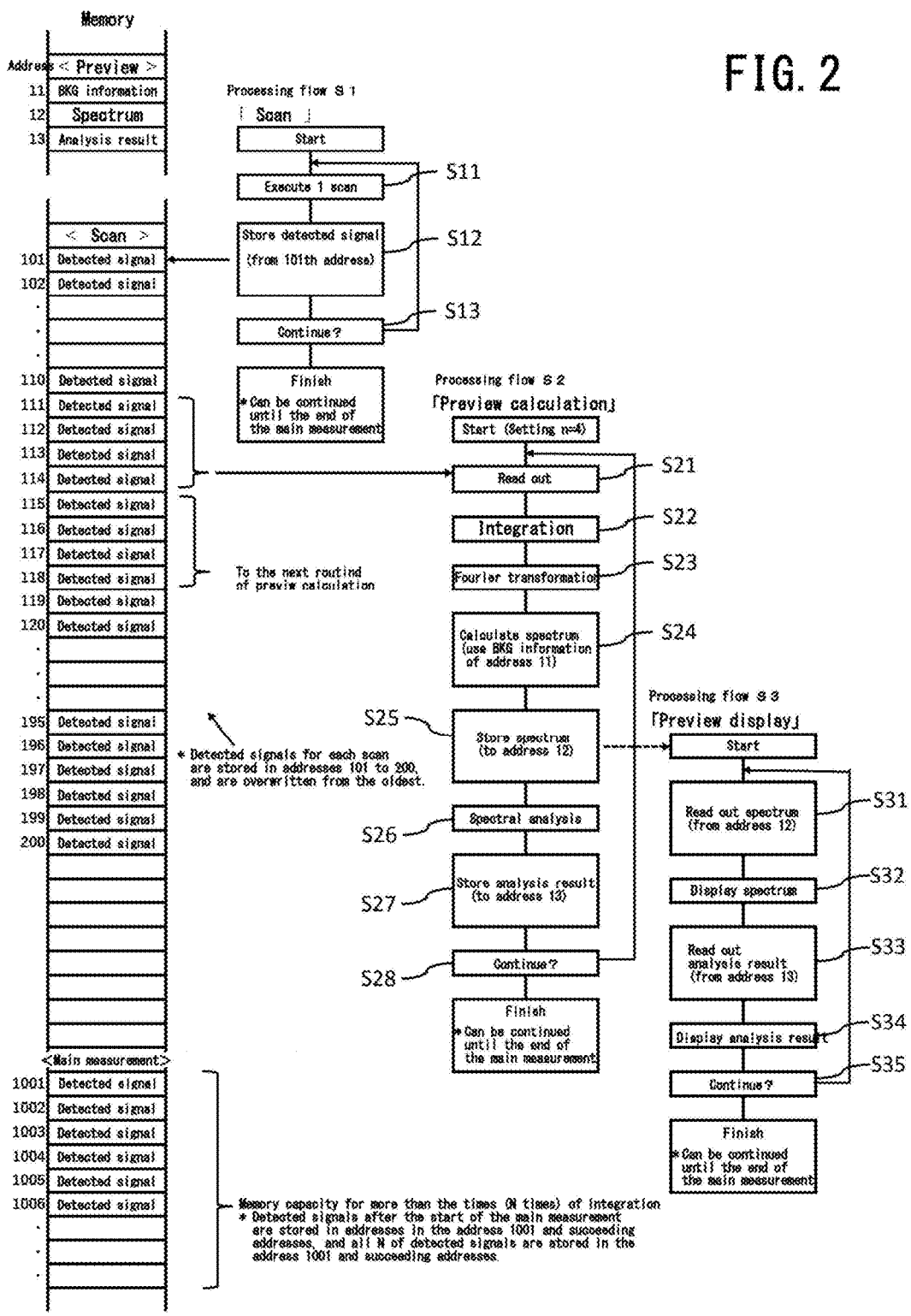
FIG. 2 illustrates a flow of data processing in the spectrometer.

The processing flow S1 (scan) of FIG. 2 is described. The data processor 16 acquires the detected signal of one scan (S11), and stores the detected signal in an address 101 of the memory (S12). This operation is repeated until a stop command is received (S13). The detected signal for each scan is stored in addresses 101 to 200 of the memory, for example, and when these addresses become full, the signals are sequentially overwritten from the oldest and stored.

Next, the processing flow S2 (preview calculation) is described. The data processor 16 starts a preview calculation simultaneously with the start of the scan (S1) or after the scan (S1) has settled to a certain extent. Here, the number of times of integration (n: n is an integer of 1 or greater) is set to 4 times, for example. The operating portion 42 reads out 4 of the latest detected signals from the memory 44 (e.g., addresses 111 to 114) (S21), integrates the same (S22), Fourier-transforms the same (S23) to calculate a spectrum of a single-beam (SB spectrum). Next, the SB spectrum is divided by the BKG information to calculate the transmission spectrum (S24). The calculated transmission spectrum is stored in an address 12, for example, as a preliminary spectral information (S25). The above-described procedure for calculating the transmission spectrum is merely an example, and it is not limited thereto.

Here, the operating portion 42 executes the spectral analysis based on the stored transmission spectrum (S26), and stores the analysis result at an address 13 (S27), for example. In the spectral analysis, a qualitative analysis based on present/absence of a peak in the transmission spectrum is executed. Or, a qualitative analysis or a spectral classification using a spectral database or machine learning may be executed. Or, a functional group analysis using a spectral feature indicating the presence of a functional group may be executed.

These processes (S21 to S27) are repeated until a stop command is received (S28). In the following preview calculation, the 4 detected signals that are the latest at the start (e.g., addresses 115 to 118) are read out to be processed. For each time the routine of the preview calculation is repeated, the calculated preliminary spectral information and the spectral analysis result are overwritten and stored in the predetermined addresses (addresses 12 and 13) of the memory 44.

Next, the processing flow S3 (preview display) is described. The data processor 16 reads out the latest preliminary spectral information stored in the address 12 of the memory 44 (S31), and graphically displays the same on the display 46 (S32). In graphical display, a wavenumber region or a wavelength region is on the horizontal axis, and an intensity value of spectrum is on the vertical axis; therefore, the spectrum is displayed clearly.

Moreover, the data processor 16 reads out information of the latest spectral analysis result stored in the address 13 of the memory 44 (S33), and displays the same on the display 46 (S34). The content displayed thereon is not limited to the names of substances or substance groups, which are the analysis result, and attentions like a user's manual based on the analysis result may be displayed. The preview display is repeated until a stop command is received (S35), and the latest information is displayed in real time.

The scan operation (processing flow S1), the preview calculation (processing flow S2), and the preview display (processing flow S3) can be continued until the main measurement is completed as necessary.

The main measurement can be started at any timing during the preview. That is, a measurer can determine whether the sample set on the FTIR 100 is the sample expected by the measurer or not by the information shown in the preview display. If it is the unexpected sample, the measurer may change the measurement condition to a suitable one, and then push a start button of the main measurement of the FTIR 100. After the start of the main measurement, the detected signals by the scan are stored at addresses for the main measurement (e.g., from address 1001 and the subsequent addresses). The number (N) of times of integration in the main measurement is greater than the number (n) of times of integration in the preview, and it is usually set to a number (N) that is several ten times or greater than the number (n). For example, in the measurement of which the number (N) of times of integration in the main measurement is set to less than several ten times, the number n of times of integration in the preview is set to one. In the measurement of which the number N of times of integration is set to a greater number in order to increase the signal to noise ratio (S/N) of the main measurement, the number n of times of integration in the preview needs to be set to a number greater than one. Without the detected signal of the main measurement being overwritten, all of the detected signals of N times are stored, and a measurement data of N times of integration is calculated. Then, the spectral information of the sample is calculated based on the measurement data and the BKG information.

In the processing flow of FIG. 2, a case where both of the preliminary spectral information and the spectral analysis result are shown in the preview is described, but it is not limited thereto, and either one of the information may be shown in the preview display.

FIGS. 3A-3D and FIGS. 4A-4D are examples of when both of the preliminary spectral information and the spectral analysis result are shown in the preview display. Like these examples, information of the analysis result such as "no peak" or "polystyrene" can be shown in the preview display together with the graphical display of the preliminary spectrum, so that information effective for the measurer can be provided.

Furthermore, by additionally displaying information that is unexpected by the measurer as described in the following, a more effective information can be provided to the measurer.

For example, in a microscopic ATR measurement, it is generally assumed that a reflection measurement preview with a Cassegrain mirror can be executed before bringing the sample in contact with the ATR prism, and if a simple qualitative analysis based on a reflection spectrum (not by the ATR measurement) can be executed in the reflection measurement preview, a risk can be taken into consideration in advance, and the best measurement condition (selection of prism material) can be set. That is, since the features of the sample can be known before bringing the ATR prism into contact with the sample, a possibility of damaging the prism by pressing can be noticed by the measurer (e.g., FIG. 4D to be described later), for example.

FIG. 3A illustrates an example of when the analysis result is "no peak". The measurer may assume that there is no contamination of the ATR prism (ATR crystal element); however, since the analysis result becomes the same when the contact state of the ATR prism and the sample is not good, or the concentration of the sample is low, these unexpected matters may be displayed as a user's manual in the preview display.

FIG. 3B illustrates an example of when the analysis result is "polystyrene". The measurer may assume that it is during measurement of polystyrene; however, since the analysis result becomes the same when a calibration sample (polystyrene) is still in the optical path by mistake, this unexpected matter may be displayed as a user's manual in the preview display.

FIG. 3C illustrates an example of when the analysis result is "ethanol". The measurer may assume that it is during measurement of ethanol; however, since the analysis result becomes the same when there is a solvent (ethanol) left without being wiped, this unexpected matter may be displayed as a user's manual in the preview display.

FIG. 3D illustrates an example of when the analysis result is "water". The measurer may assume that it is during measurement of water; however, since the analysis result becomes the same when a window plate such as KBr is damaged by adsorbing water vapor, this unexpected matter may be displayed as a user's manual in the preview display.

FIG. 4A illustrates an example of when the analysis result is "peak inversion". Since such spectrum is measured when the measurer has reversed the order of the BKG measurement and the sample measurement, or executed the BKG measurement before purging by mistake, this matter may be displayed as a user's manual in the preview display.

FIG. 4B illustrates an example of when the analysis result is "$CO_2$". The measurer may assume a state of which the gas purging is stopped in a sample chamber; however, since the analysis result becomes the same when the time passed from the last BKG measurement is too long, this unexpected matter may be displayed as a user's manual in the preview display.

FIG. 4C illustrates an example of when the analysis result is "organic matter". The measurer may assume that it is during measurement of an organic matter; however, since the analysis result becomes the same when there is contamination, this unexpected matter may be displayed as a user's manual in the preview display.

FIG. 4D illustrates an example of when the analysis result is "metal oxide". The measurer may assume that it is during measurement of a metal powder (hard sample) with an ATR diamond prism; however, since there is a possibility of the prism being damaged with materials such as ZnSe, this unexpected matter may be displayed as a user's manual in the preview display.

According to the FTIR 100 of the present embodiment, the preliminary spectral information is shown in the preview display on the display 46 before the start of the main measurement. Based on the preliminary spectral information, the measurer can briefly predict substances contained in the sample, and confirm or re-adjust, as necessary, the type of a cell or a solvent used in the main measurement, so that troubles at the main measurement can be avoided in advance. When the main measurement is started without the preview display and sufficient confirmation, it is not only a spectrum under unsuitable measurement condition or an unexpected spectrum is acquired, but also the sample, the cell or the prism may be damaged, so that measurement time may be wasted for exchanging them or re-measurement.

Moreover, in the FTIR 100 of the present embodiment, the preview display of the preliminary spectral information contains the result of the spectral analysis based on the preliminary spectral information, and information useful for beginners can be indicated, in particular. The spectral analysis result contains information (substance information) of a result of spectral search using a spectral database, or information (substance group information) of a result of spectral classification using machine learning. Moreover, together with the substance information or the substance group information, attentions upon handling of the sample can be displayed like a user's manual (refer to FIGS. 3A-3D and FIGS. 4A-4D). For example: when the sample is toxic or explosive, it is possible to display and warn its dangerousness; when the sample is volatile, it is possible to display and warn to promote ventilation; when the sample is insoluble, it is possible to indicate the suitable type of solvents or detergents, or to warn not use solvents or detergents that may damage the device.

By setting the sample during the preview display, information such as the names of substances and groups of the sample, its features, and attentions upon handling are displayed at that timing. Based on the information displayed in the preview display, the measurer himself/herself can determine whether the sample is the expected sample or not, and it becomes easier to predict the result of the main measurement. Or, attentions upon handling of the sample in the main measurement can be confirmed at that point.

Moreover, examples of a case where the expected result cannot be acquired regardless of setting the sample include: the amount or concentration of the component contained in the sample has reached the lower limit of detection (or exceeded the upper limit of detection) as shown in FIG. 3 (A); the sample is not disposed correctly on the optical path (e.g., the ATR prism and the sample are not in contact); and the order of the BKG measurement and the sample measurement is mistaken as shown in FIG. 4 (A). By displaying a message, like a user's manual, based on the spectral analysis result before the start of the main measurement, a possibility of noticing these mistakes by the measurer himself/herself becomes higher, and a suitable measure may be taken before the start of the main measurement.

In particular, when an unknown sample is measured, without strict measurement condition setting firstry, the sample is set in a measurement chamber to acquire information of the preview display, so that a cell suitable for that sample can be selected for the main measurement. It becomes easier to avoid troubles such as the cell becoming dirty by a substance (unknown substance) that tends to remain on the cell, or pouring a sample that may dissolve the window plate. Moreover, there is an effect such that present/absence of an explosive or flammable substance can be easily confirmed before encapsulating the unknown substance in a heating cell. Moreover, it is also advantageous in the point that the substance of a measurement residue can be identified by continuing the preview display during the main measurement.

Not limited to FTIR, the present invention is preferred in Raman spectrometers that irradiates an excitation light to a sample, detects a Raman scattering light from the sample, and calculates a Raman spectral information of the sample. In Raman spectrometers, a spectrum measured in a state where irradiation of the excitation light to the sample is stopped is stored in a memory as a background (BKG) information.

Figure 5:
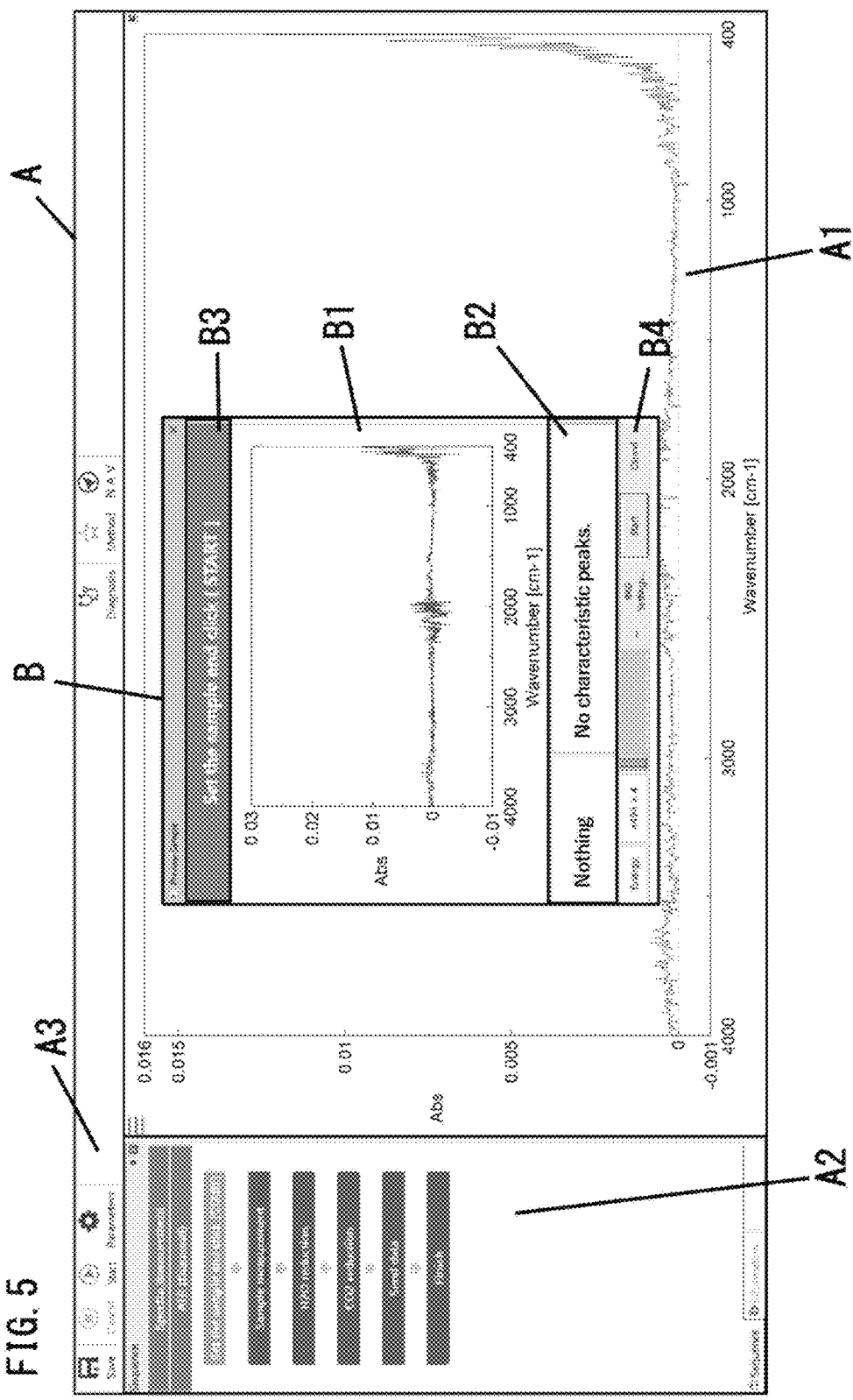
FIG. 5 illustrates a configuration of a sample preview screen according to the embodiment.

FIG. 5 shows an example of a screen during execution of the above data processing program. The data processor 16 displays on the display 46 a main screen A of a spectrum measurement software incorporating the data processing program of the present embodiment. The main screen A is composed of a measurement spectrum screen A1 in the center, a sequence screen A2 on the left side and a menu bar A3 at the top of the screen A. The measurer can utilize a condition setting screen in order to set desired measurement conditions. FIG. 5 shows a case that the ATR method with a diamond prism is set. The data processor 16 automatically configures the measurement procedure (that is "sequence") according to the set measurement conditions, and displays the measurement procedure on the sequence screen A2. Currently executing step of the measurement procedure is displayed in a specific color.

If the measurer presses a "START" button of the menu bar A3, the data processor 16 displays a sample preview screen B overlaid on the main screen A, and starts the preview (processing flows S1 to S3). The sample preview screen B is composed of a preliminary spectral screen B1 in the center, an analysis result screen B2 below the screen B1, a guidance screen B3 at the top of the screen B (for guiding according to the measurement procedure) and a menu bar B4 at the bottom of the screen B. During the preview, the preliminary spectral information is displayed on the screen B1 in real time, and the analysis result is also displayed on the screen B2 in real time.

After the start of the preview, firstly, the BKG measurement is executed in a state which the sample is not set, and the acquired BKG information is stored in the memory 44. The sample preview screen B of FIG. 5 indicates the preliminary spectral information acquired in the state that the sample has not yet been set after the BKG measurement. The data processor 16 displays on the screen B2 the analysis result that "Nothing. No characteristic peaks." according to the spectral analysis result of the preliminary spectral information. The measurer is prompted to set sample by such display of the analysis result, because one of the reasons why no peaks are found is that the sample is not set.

For further improvement of the measurer's convenience, in the case of the analysis result of "No peaks", the user's manual matters such as "a sample is not set" or "a sample setting mistake" associated with "No peaks" may be displayed together.

The measurer can properly set the sample based on the preview display or can adjust the measurement conditions. Otherwise, if there is any defect, the measurer can correct the condition of the sample (present/absence of contamination, etc.) based on the preview display or can correct the condition of the measurement (present/absence of damage of the window plate, etc.) based on the preview display. Hence, before the start of the main measurement, the measurer can adjust or correct the above by the preview display of the screen B, while checking whether the sample in the sample chamber is set as expected (or whether the sample is in good condition) or whether the measurement conditions are appropriate (or whether the measurement is in good condition), etc.

After the adjustment or correction, the measurer can start the main measurement by presses a "START" button of the menu bar B4 at the bottom of the sample preview screen B. After the start of the main measurement, the sample preview screen B may be automatically hidden. The spectral data (integration data, etc.) acquired by the main measurement is displayed on the measurement spectrum screen A1 (also called "spectral view screen") of the main screen A in real time.

Figure 6:
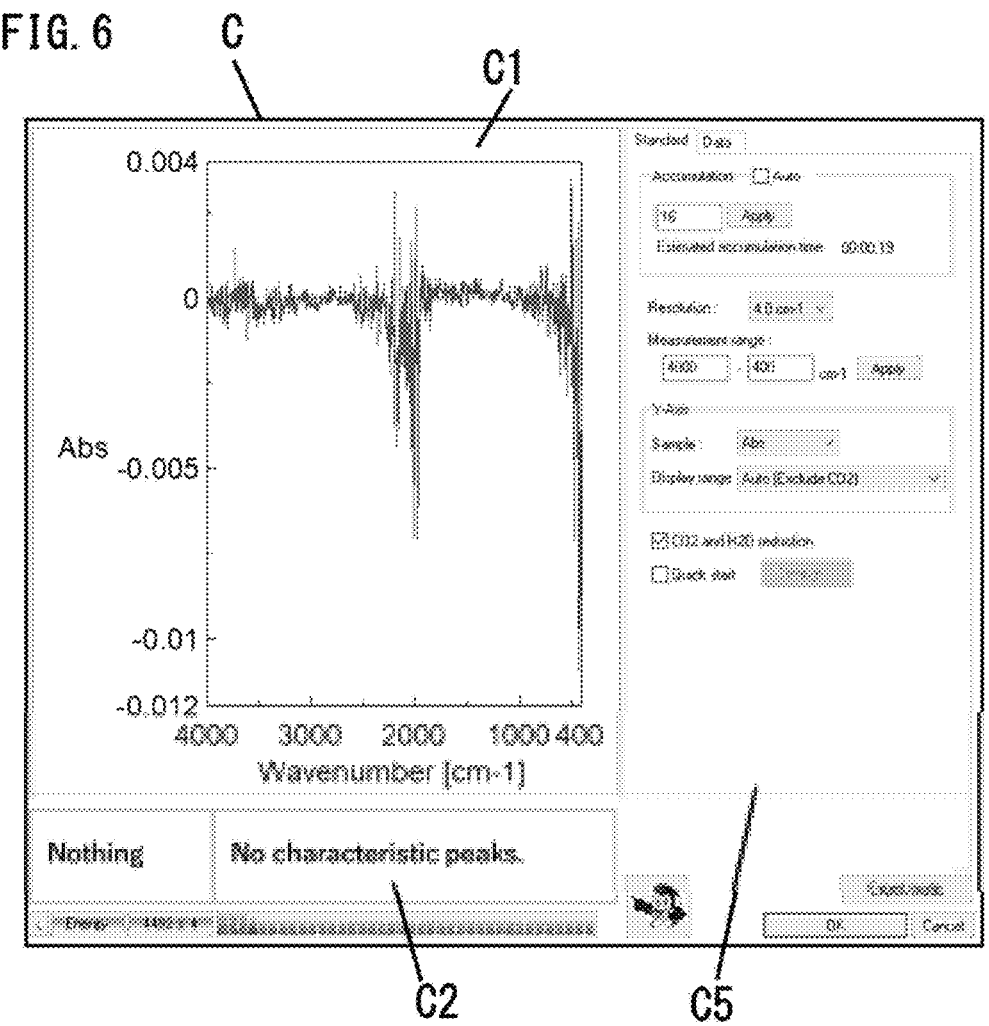
FIG. 6 illustrates another configuration of the sample preview screen.

FIG. 6 shows a sample preview screen C of another embodiment. The sample preview screen C is composed of a preliminary spectral screen C1, an analysis result screen C2 and a condition setting screen C5 for the measurement parameters, etc. The condition setting screen C5 has an input section of the measurement parameters such as the integration number (times), the resolution ($cm^{-1}$), the measurement range (the wavenumber region), etc. Hence, one screen C makes it possible for the measurer to change the measurement conditions smoothly while checking the preview display.

Figure 7:
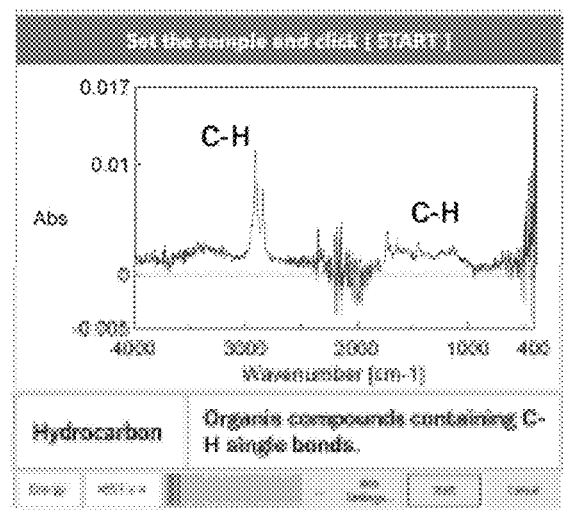
FIG. 7 illustrates a display example of the sample preview screen.
Figure 8:
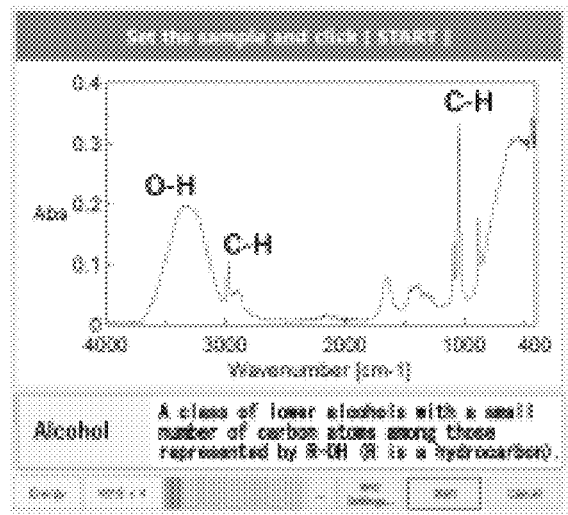
FIG. 8 illustrates a display example of the sample preview screen.
Figure 9:
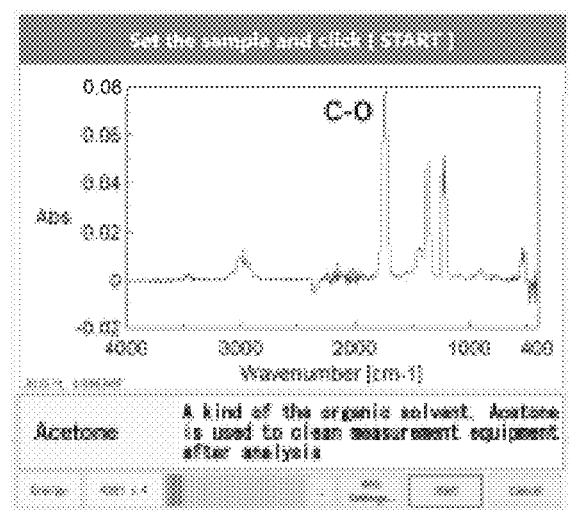
FIG. 9 illustrates a display example of the sample preview screen.

FIGS. 7-9 show a display example of the sample preview screen. Along with the spectrum, a kind (a name of group) of the sample as results of the spectral classification and a representative functional group (a chemical bond, etc.) as results of the functional group analysis are displayed on each screen.

In the example of FIG. 7, it is displayed that the sample is in the group of "Hydrocarbon" and that the sample is "Organic compounds containing C—H single bonds". Chemical bonding symbols of "C—H" are displayed near the corresponding peaks.

In the example of FIG. 8, it is displayed that the sample is in the group of "Alcohol" and the sample refers to "a class of lower alcohols with a small number of carbon atoms among those represented by R—OH (R is a hydrocarbon)". Chemical bonding symbols of "O—H, C—H" are displayed near the corresponding peaks, respectively.

In the example of FIG. 9, it is displayed that the sample is in the group of "Acetone" and that the sample is "A kind of the organic solvent. Acetone is used to clean measurement equipment after analysis". A chemical bonding symbol of "C—O" is displayed near the corresponding peaks.

On the analysis result screen B2 of the present embodiment, it may be displayed "Noticeable atmospheric absorption spectrum" as analysis results. Such display promote the measurer re-measurement of BKG information, because the atmospheric absorption spectrum tends to be noticeable when the time passed from the last BKG measurement is too long. In the case of the analysis result of "Noticeable atmospheric absorption spectrum", the attention awakening such as "Re-measurement of BKG information" associated with "Noticeable atmospheric absorption spectrum" may be displayed together.

In another case, on the analysis result screen B2 of the present embodiment, it may be displayed "Generating a spectrum that exceeds Abs 3" in order to make the measurers aware that the sample concentration too high.

In still another case, on the analysis result screen B2 of the present embodiment, it may be displayed "Generation of a baseline which is not flat" in order to make the measurers aware of the presence of light scattering caused by a mutual interaction between infrared light and sample or to make the measurers aware that a crystal element selected for ATR method is not suitable.

REFERENCE SIGNS LIST

10 Infrared light source
12 Interferometer
14 Infrared detector
14a Amplifier
14b A/D convertor
16 Data processor
20 Beam splitter
22 Fixed mirror
24 Movable mirror
26 Sample holder
28 Moving device
30 Semiconductor laser
32 Laser detector
34 Movable-mirror controller
40 Controller
42 Operating portion
44 Memory
46 Display
48 User interface
50 Communication device
52 Portable equipment
100 Fourier transform infrared spectrometer (FTIR)

The invention claimed is:

1. A spectrometer that irradiates a measurement light to a sample, detects a light that transmits or reflects the sample or a light that is emitted from the sample by a detector, and calculates a spectral information of the sample based on a detected signal containing the spectral information of the sample, the spectrometer comprising:
  a data processor that
    acquires the detected signals repetitively,
    calculates a preliminary spectral information of the sample based on at least n (n: an integer of 1 or greater) of the latest detected signals and a background (BKG) information acquired and retained in advance in a state without the sample or a state which irradiation of the measurement light is stopped, and retains the preliminary spectral information,
    calculates the preliminary spectral information of the sample based on at least n of the latest detected signal and the BKG information again, and updates the retained preliminary spectral information, and
    repeats calculation of the preliminary spectral information and update thereof; and
  a display that displays the preliminary spectral information retained and updated in the data processor on a graph having a wavenumber range or a wavelength range on one axis and a spectral intensity value on the other axis in real time, wherein the data processor starts integration of N (N: an integer greater than n) of the detected signals while the preliminary spectral information is graphically displayed in real time, and acquires the spectral information of the sample based on an integrated value thereof.

2. The spectrometer of claim 1, wherein the data processor executes a spectral analysis based on the preliminary spectral information each time the preliminary spectral information is calculated, and retains and updates a spectral analysis result, and the display displays the spectral analysis result retained and updated in the data processor together with the preliminary spectral information in real time.

3. The spectrometer of claim 2, wherein the spectral analysis includes a qualitative analysis based on presence/absence of a peak in the preliminary spectral information, a qualitative analysis or a spectral classification of the preliminary spectral information using a spectral database or machine learning, or a functional group analysis using a spectral feature indicating the presence of a functional group.

4. A spectrometer that irradiates a measurement light to a sample, detects a light that transmits or reflects the sample or a light that is emitted from the sample by a detector, and calculates a spectral information of the sample based on a detected signal containing the spectral information of the sample, the spectrometer comprising:

a data processor that acquires the detected signal repetitively, calculates a preliminary spectral information of the sample based on at least n (n: an integer of 1 or greater) of the latest detected signals and a background (BKG) information acquired and retained in advance in a state without the sample or a state which irradiation of the measurement light is stopped, executes a spectral analysis based on the preliminary spectral information, and retains a spectral analysis result, calculates the preliminary spectral information of the sample based on at least n of the latest detected signal and the BKG information, executes the spectral analysis again, and updates the retained spectral analysis result, and repeats calculation of the preliminary spectral information, execution of the spectral analysis and update of the spectral analysis result; and a display that displays the spectral analysis result retained and updated in the data processor in real time, wherein the data processor starts integration of N (N: an integer greater than n) of the detected signals while the spectral analysis result is displayed in real time, and acquires the spectral information of the sample based on the integrated value.

5. The spectrometer of claim 4, wherein the spectral analysis includes a qualitative analysis based on presence/absence of a peak in the preliminary spectral information, a qualitative analysis or a spectral classification of the preliminary spectral information using a spectral database or machine learning, or a functional group analysis using a spectral feature indicating the presence of a functional group.

* * * * *